United States Patent
Townley et al.

(10) Patent No.: US 11,247,593 B2
(45) Date of Patent: *Feb. 15, 2022

(54) VEHICLE SEATING ASSEMBLY WITH AESTHETIC TRIM COVER ASSEMBLY

(71) Applicant: LEAR CORPORATION, Southfield, MI (US)

(72) Inventors: Lisa Townley, Allen Park, MI (US); Thomas Korycinski, Bloomfield Township, MI (US); Paul S. Severinski, Brownstown, MI (US); Louella Ann Patterson, Goodells, MI (US); Thomas Welch, Jr., Ortonville, MI (US); Sara Russo, Macomb, MI (US); Dorothy Kromm, Lake Orion, MI (US)

(73) Assignee: LEAR CORPORATION, Southfield, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/119,074

(22) Filed: Aug. 31, 2018

(65) Prior Publication Data

US 2018/0370403 A1    Dec. 27, 2018

Related U.S. Application Data

(63) Continuation-in-part of application No. 14/867,763, filed on Sep. 28, 2015, now Pat. No. 10,118,525.
(Continued)

(51) Int. Cl.
*B60N 2/70* (2006.01)
*B23K 13/00* (2006.01)
(Continued)

(52) U.S. Cl.
CPC ............ *B60N 2/7017* (2013.01); *B23K 13/00* (2013.01); *B60N 2/5866* (2013.01);
(Continued)

(58) Field of Classification Search
CPC .......... B23K 13/00; B23K 13/02; B60N 2/58; B60N 2/5866; B60N 2/5816;
(Continued)

(56) References Cited

U.S. PATENT DOCUMENTS 4,313,776 A * 2/1982 Urai ..................... A47C 27/146
156/220
4,534,595 A  8/1985 Abe et al.
(Continued)

FOREIGN PATENT DOCUMENTS

CN      1970338 A    5/2007
CN    101128304 A    2/2008
(Continued)

OTHER PUBLICATIONS

Chinese First Office Action dated Jun. 14, 2017, Application No. 201510644179.9, Applicant Lear Corporation, 10 Pages.
(Continued)

*Primary Examiner* — Philip F Gabler
(74) *Attorney, Agent, or Firm* — Brooks Kushman P.C.

(57) ABSTRACT

According to one or more embodiments, a vehicle seat assembly includes a cushion and a leather trim cover assembly disposed over the cushion. The leather trim cover assembly includes a leather upper layer and a foundation layer secured to the leather upper layer at radio-frequency weld points. The radio-frequency weld points define at least one design boundary adjacent a raised portion of a protruding design in the leather trim cover assembly.

20 Claims, 4 Drawing Sheets

Related U.S. Application Data

(60) Provisional application No. 62/059,387, filed on Oct. 3, 2014.

(51) Int. Cl.
  *B60N 2/58* (2006.01)
  *B60N 2/72* (2006.01)
  *B23K 13/02* (2006.01)

(52) U.S. Cl.
  CPC ............ *B60N 2/5891* (2013.01); *B23K 13/02* (2013.01); *B60N 2/72* (2013.01)

(58) Field of Classification Search
  CPC ...... B60N 2/5891; B60N 2/7017; B60N 2/72; A47C 7/18; A47C 7/185; A47C 7/22; A47C 7/24; A47C 7/26
  See application file for complete search history.

(56) References Cited

U.S. PATENT DOCUMENTS

| | | |
|---|---|---|
| 4,627,660 A | 12/1986 | Kon |
| 4,771,150 A | 9/1988 | Kon |
| 4,833,016 A | 5/1989 | Segawa et al. |
| 4,849,265 A | 7/1989 | Ueda et al. |
| 4,995,926 A | 2/1991 | Urai |
| 5,000,805 A | 3/1991 | Lowe |
| 5,254,197 A | 10/1993 | Klems |
| 5,336,352 A | 8/1994 | Takura |
| 5,395,473 A | 3/1995 | Nixon |
| 5,486,252 A | 1/1996 | Wong |
| 6,786,541 B2 | 9/2004 | Haupt et al. |
| 6,861,019 B2 | 3/2005 | Ali et al. |
| 7,229,129 B2 | 6/2007 | White et al. |
| 7,637,573 B2 | 12/2009 | Bajic et al. |
| 7,851,039 B2 | 12/2010 | Boinais et al. |
| 8,398,114 B2 | 3/2013 | Laframboise et al. |
| 8,727,449 B2 | 5/2014 | Laframboise et al. |
| 8,783,768 B2 | 7/2014 | Severinski et al. |
| 9,445,632 B2 | 9/2016 | De Luca Neto |
| 10,118,525 B2 * | 11/2018 | Kromm ................ B60N 2/5816 |
| 2005/0238842 A1 | 10/2005 | Schindzielorz et al. |
| 2006/0110572 A1 | 5/2006 | Herrero et al. |
| 2007/0131347 A1 | 6/2007 | Boes et al. |
| 2008/0169678 A1 | 7/2008 | Ishida et al. |
| 2009/0110941 A1 | 4/2009 | Takezawa et al. |
| 2012/0175935 A1 | 7/2012 | Severinski et al. |
| 2014/0137610 A1 | 5/2014 | Chen et al. |

FOREIGN PATENT DOCUMENTS

| | | |
|---|---|---|
| CN | 102582488 A | 7/2012 |
| CN | 105480133 A | 4/2016 |
| DE | 36 06 599 A1 | 10/1986 |
| DE | 43 13 759 A1 | 11/1994 |
| DE | 102012219123 A1 | 4/2014 |
| DE | 10 2015 219 162 A1 | 4/2016 |
| JP | S5110632 A | 1/1976 |
| JP | S5582651 A | 6/1980 |
| JP | S59-095134 A | 6/1984 |
| JP | S61-082778 A | 4/1986 |
| WO | 2006/091532 A1 | 8/2006 |

OTHER PUBLICATIONS

Chinese Second Office Action dated Feb. 24, 2018, Application No. 201510644179.9, Applicant Lear Corporation, 12 Pages.
Chinese Third Office Action dated Aug. 14, 2018, Application No. 201510644179.9, Applicant Lear Corporation, 9 Pages.
German Office Action dated Apr. 11, 2020, Application No. 10 2019 207 543.6, Applicant Lear Corporation, 19 Pages.
Japanese Office Action dated Oct. 2, 2020 (with English Machine Translation), Application No. 2019-089432, 8 Pages.
Japanese Second Office Action dated May 19, 2021 (with English Machine Translation), Application No. 2019-089432, 8 Pages.
Chinese First Office Action (with English Machine Translation) dated Aug. 4, 2021, Application No. 201910383456.3, 23 Pages.
Non-Final Rejection dated Nov. 23, 2021, U.S. Appl. No. 17/038,788, 24 Pages.

* cited by examiner

VEHICLE SEATING ASSEMBLY WITH AESTHETIC TRIM COVER ASSEMBLY

CROSS-REFERENCE TO RELATED APPLICATIONS

This application is a continuation-in-part of U.S. application Ser. No. 14/867,763, filed on Sep. 28, 2015, which claims benefit of U.S. provisional application Ser. No. 62/059,387 filed Oct. 3, 2014, the disclosures of which are hereby incorporated in their entirety by reference herein.

TECHNICAL FIELD

The present application is directed to a vehicle seating assembly with an aesthetic trim cover assembly.

BACKGROUND

Vehicle seat assemblies are often fitted with a leather trim cover assembly. Stitching is often provided in trim cover assemblies made of leather and other materials to provide a desirable appearance. Stitching can be easily removed and provides limited design capability due to the stitch patterns, thus reducing the durability of the bond and flexibility in design capability. Furthermore, certain materials, such as leather, are typically avoided in heat-press processes due to shrinking with heat exposure, stiffening with adhesives, and burning causing texture damage.

SUMMARY

According to one or more embodiments, a vehicle seat assembly includes a cushion and a leather trim cover assembly disposed over the cushion. The leather trim cover assembly includes a leather upper layer and a foundation layer secured to the leather upper layer at radio-frequency weld points. The radio-frequency weld points define at least one design boundary adjacent a raised portion of a protruding design in the leather trim cover assembly.

According to at least one embodiment, the leather trim cover assembly may have a first thickness at the radio-frequency weld points and a second thickness at the raised portion, the second thickness being greater than the first thickness. In one or more embodiments, an adhesive layer may bond the leather upper layer and the foundation layer at the radio-frequency weld points. Further, in certain embodiments, the leather upper layer may not be adhered to the foundation layer at the raised portion. In other embodiments, the leather upper layer may be adhered to the foundation layer at the raised portion. In one or more embodiments, the foundation layer may be a spacer layer. In other embodiments, the foundation layer may be a foam layer. According to at least one embodiment, the radio-frequency weld points may define a plurality of design boundaries, each design boundary adjacent a corresponding raised portion of the protruding design. In one or more embodiments, the radio-frequency weld points may have a width of 0.05 to 50 mm. In at least one embodiment, the radio-frequency weld points may provide a bond strength of at least 2 N per 5 cm. According to at least one embodiment, the radio-frequency weld points may comprise 1% to 80% of a surface of the leather trim cover assembly.

According to one or more embodiments, a trim assembly for a vehicle seat assembly includes a trim panel and a foundation layer secured to the trim panel at at least one design boundary to form a trim cover assembly securable over a cushion. The at least one design boundary is adjacent to a corresponding raised portion of a protruding design.

According to at least one embodiment, radio-frequency weld points may be provided between the foundation layer and the trim panel to secure the trim panel to the foundation layer, and an adhesive layer may bond the trim panel and the foundation layer at the radio-frequency weld points. In one or more embodiments, the trim assembly may have a first thickness at the radio-frequency weld points and a second thickness at the raised portion, the second thickness being greater than the first thickness. In certain embodiments, the radio-frequency weld points may have a width of 0.05 to 50 mm. In one or more embodiments, the radio-frequency weld points may provide a bond strength of at least 2 N per 5 cm of the protruding design. According to at least one embodiment, the radio-frequency weld points may comprise 1% to 80% of a surface of the trim assembly. In certain embodiments, the trim panel may include leather, synthetic leather, vinyl, fabric, synthetic suede, non-woven fabric, or other suitable materials or combinations thereof.

According to one or more embodiments, a method of making a vehicle seat assembly includes providing a cushion, providing a trim cover assembly comprising a leather trim layer and a foundation layer disposed inward of the leather trim layer, securing the leather trim layer and foundation layer at predefined radio-frequency weld points defining at least one design boundary adjacent to a raised portion of a protruding design in the trim cover assembly, and disposing the trim cover assembly over the cushion. In certain embodiments, the predefined radio-frequency weld points may comprise 1% to 80% of a surface of the trim cover assembly.

DETAILED DESCRIPTION

As required, detailed embodiments of the present disclosure are disclosed herein; however, it is to be understood that the disclosed embodiments are merely examples of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Moreover, except where otherwise expressly indicated, all numerical quantities in this disclosure are to be understood as modified by the word "about". Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

According to embodiments of the present disclosure, a trim cover assembly for a vehicle seat cushion is provided. In at least one embodiment, the trim cover assembly includes a trim layer (A-surface layer) having a design formed integrally therein by radio-frequency (RF) welding the trim layer to a foundation layer via an adhesive. In at least one embodiment, the contact points between the layers are design boundaries adjacent to raised portions defining a protruding design in the leather layer A-surface. RF welding (also referred to as dielectric sealing or high-frequency welding) uses radio frequency energy to produce molecular agitation in thermoplastic materials such that they melt and flow together. A magnetic field is generated between electrodes, passing through the components, fusing the material layers together at the weld points.

Figure 1:
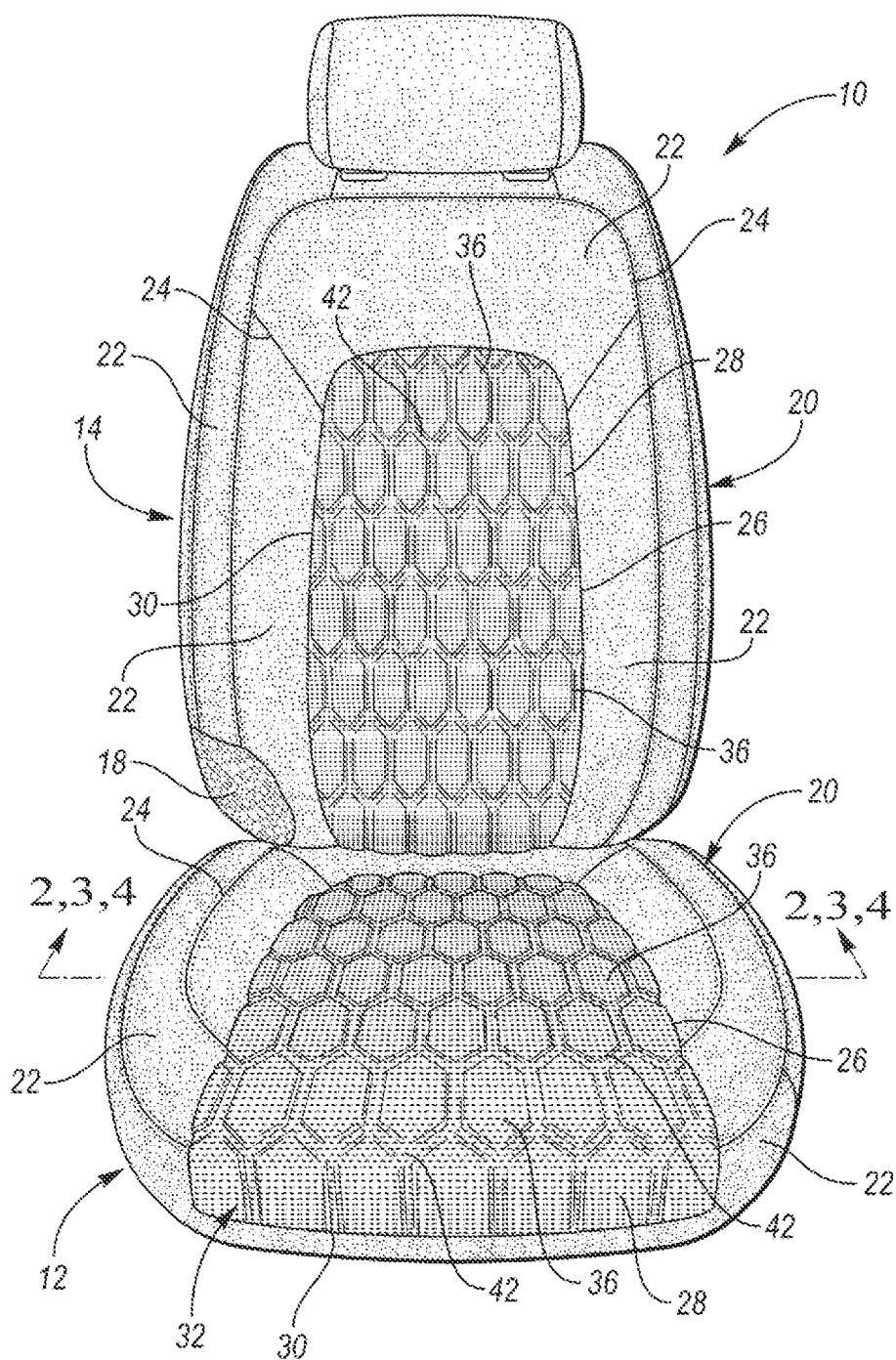
FIG. 1 illustrates a perspective front view of an exemplary vehicle seat assembly in accordance with one embodiment of the present disclosure.

Referring to FIG. 1, one embodiment of a seat assembly 10 is shown. While the vehicle seat assembly 10 is illustrated in FIG. 1 to be a bucket seat assembly, it should be understood that the principles of the present disclosure are applicable to other types of seat assemblies, such as bench, captain and other seat assemblies. It should also be understood that the principles of the present disclosure are applicable to other vehicle interior trim components where leather is a component such as backrests, back support pads, armrests, and head restraints. Still further, it should also be understood that the principles of this disclosure are applicable to all types of vehicle seat assemblies as well as non-vehicle seat assemblies. The seat assembly 10 can be configured for use in a vehicle, such as motor vehicle like a car or truck, or for use in non-vehicular applications. The seat assembly 10 includes a seat bottom 12 and a seat back 14 pivotally disposed on the seat bottom 12. The seat bottom 12 is mountable to a surface such as a vehicle floor.

The seat bottom 12 and the seat back 14 each include a seat foam pad 18 (FIG. 1) supported on a seat frame (not shown). The seat foam pads 18 are disposed under a trim cover assembly 20. The trim cover assembly 20 provides an exterior seating surface. The trim cover assembly 20 includes a trim cover that is made of at least one suitable material, such as, but not limited to, leather, synthetic leather, vinyl, fabric, synthetic suede, non-woven fabric, or combinations thereof (fabric-to-fabric, leather-to-leather, fabric-to-leather, leather-to-fabric, etc.). Hereinafter, although the trim cover may be referred to as a leather trim cover or leather layer, it is understood that the material for the trim layer may be any suitable material, and leather is disclosed as a non-limiting example for the trim assembly described herein. It should be understood that the cushion 18 for the seat back 14 can differ from the cushion 18 of the seat bottom 12. Likewise, it should be understood that the trim cover assembly 20 for the seat back 14 can differ from the trim cover assembly 20 for the seat bottom 12. The trim cover assembly 20 can readily be useable in a heat/cool seat assembly 10, but may be equally useable with other types of seat assemblies, such as non-temperature controlled seat assemblies. The trim cover assembly 20 can have other conventional members such as a thin foam layer and trim attachments, and is attachable to the seat component(s) in any suitable manner, such as by attaching to the frame and/or cushion members.

In at least one embodiment, the trim cover assembly 20 comprises a plurality of trim cover panels that are secured together such that the trim cover assembly 20 has a single opening at the open end into which the seat bottom 12 or the seat back 14 may be inserted. More specifically, trim cover assembly 20 has a plurality of peripheral panels 22 that are stitched, or otherwise secured, together at seams, such as 24 to form a central opening 26. A central panel portion 28 is likewise stitched, or otherwise secured, to the peripheral trim panels 22 at the opening 26 at stitching 30. In at least one embodiment, all of the panels 22 and 28 include at least an outer layer of leather.

In at least the illustrated embodiments, the central trim cover panel 28 has a pattern 32 comprised of a plurality of rows of protruding designs, for example geometric shaped designs, such as honeycomb-shaped designs, shown as raised portions 36. While the geometric shape designs are illustrated to be honeycomb shaped designs, it should be understood that any suitable design and/or shape can be employed. Moreover, while a plurality of the same shaped and sized designs 36 are shown, it should be understood that the designs 36 could vary in size, shape or appearance. In other words, the designs do not have to be uniform or consistently patterned. Moreover, rather than having a plurality of designs, the central trim cover panel 28 could have one design. While the raised portions 36 will be referred to herein as a plurality, it should be understood when describing the raised portions 36, that the same description will apply equally to a central trim cover panel 28 having a singular design.

Figure 2:
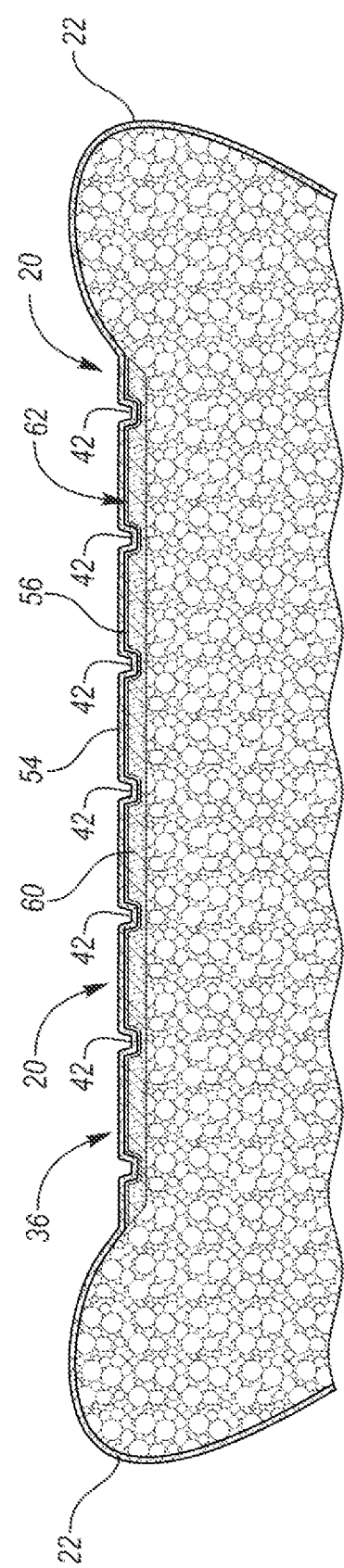
FIG. 2 is a sectional view along line 2-2 of the seat assembly of the present disclosure.

In at least one embodiment, as shown in FIG. 2, the designs are formed by raised portions 36 adjacent to design boundaries 42, forming channels extending about the designs. In at least one embodiment, the raised portions 36 each independently have a thickness (loft) of up to 50 mm, and in other embodiments, a thickness of 0.25 to 10 mm, or 0.5 to 5 mm. In other embodiments, the raised portions 36 each independently have a thickness (loft) of 1 to 7 mm. In some embodiments, the raised portions 36 have a thickness of 1 to 12 mm, and in other embodiments of 4 to 10 mm, 6 to 8 mm, or 2 to 5 mm in the finished trim cover assembly 20. In some embodiments, the raised portions 36 have a width and/or length of 0.1 to 25 cm, in some embodiments of 0.2 to 10 cm, and in other embodiments of 0.5 to 5 cm.

In an embodiment, the design boundaries 42 independently have a width between raised portions of up to 100 mm (e.g. for logos or branding on the seat assembly 10), and in other embodiments, a width of 10 to 75 mm. In other embodiments, the design boundaries 42 independently have a width between raised portions of 0.05 to 50 mm, 0.1 to 25 mm, or 0.2 to 10 mm. The raised portions 36 can each independently be spaced apart any suitable distance and in any suitable pattern. In at least one embodiment, the raised portions 36 are spaced apart 0.02 to 5 cm, in other embodiments 0.05 to 1.5 cm, and in yet other embodiments 0.1 to 1 cm in an offset row pattern. In certain embodiments, the raised portions 36 are in an offset row pattern, as shown in FIG. 1, however it should be understood that the raised portions 36 could be in an aligned row pattern. In certain embodiments, the raised portions 36 have an average thickness that is up to 10 times thicker than the average thickness of the design boundaries 42, and in other embodiments, 1.5 to 4 times thicker.

In at least certain embodiments, the design boundaries 42 are the RF welded fuse or contact points where the material layers of the trim cover assembly 20 are fused together through an RF welding process, resulting in raised portions 36 due to the selective fusing under pressure. In at least one embodiment, the design boundaries 42 include an adhesive for fusing together the layers. In other embodiments, the whole foundation layer may be prelaminated with adhesive prior to RF welding at the design boundaries. As such, in certain embodiments, although adhesive may be present at the raised portions 36, the foundation layer is not adhered at the raised portions 36 and is only RF welded to the trim layer at the design boundaries. In other embodiments, when an adhesive is present at the raised portions 36, the foundation layer may also be adhered to the trim layer at the raised portions 36. In certain embodiments, the raised portions 36 with the adhesive are RF welded to the trim layer as well.

The design boundaries 42 may be continuous or non-continuous and have any shape suitable for the desired surface design. In at least one embodiment, the design boundaries 42 may comprise 1% to 80% of the surface area of leather layer 54. In other embodiments, the design boundaries 42 comprise 10% to 70% of the surface area, and in yet another embodiment, comprise 20% to 60% of the surface area. The minimum contact area fused depends on the desired surface design of the trim layer, or leather layer, 54 and the desired strength of the bond. Trim layer and leather layer are used interchangeably hereinafter to describe non-limiting embodiments of the present disclosure, as such, the trim layer can include any suitable material and is not necessarily limited to leather. In some embodiments, to achieve a durable bond, the minimum contact area may be 5%, in other embodiments, 10% to 95%, and in yet another embodiment, 15% to 90%.

The fusing of the layers by RF welding provides a durable bond with a high-definition aesthetic design. In certain embodiments, the bond strength or peel strength of the trim cover assembly may vary depending on characteristics of the design boundaries, such as the contact area defined by and the spacing of the design boundaries 42. Furthermore, the bond or peel strength may depend on characteristics of the adhesive, such as the density, and spacing of the adhesive, as well as the processing parameters of the RF welding. The bond strength may be measured by various test methods. In one or more embodiments, the bond strength of the trim layer to the foundation layer is at least 2 N per 5 centimeter, as measured by GM Test Method GMW3220, and in other embodiments, at least 5 N per 5 centimeter. In certain embodiments, the bond strength is 5 N per 5 centimeter to 100 N per 5 centimeter, in other embodiments 8 N per 5 centimeter to 75 N per 5 centimeter, and in yet another embodiment 10 N per 5 centimeter to 50 N per 5 centimeter. In some other embodiments, the bond strength is 5 N per 5 cm to 25 N per 5 cm, or 10 N per 5 cm to 20 N per 5 cm. In other embodiments, the bond strength is at least 3 N per 25.4 cm, as measured by peel testing (Toyota Test Method TSL2105G-4.11). In certain embodiments, the peel strength is 3 N per 25.4 cm to 80 N per 25.4 cm, in other embodiments 5 N per 25.4 cm to 60 N per 25.4 cm, and in yet another embodiment 8 N per 25.4 cm to 40 N per 25.4 cm. In at least one embodiment, the bond strength may be characterized by sustaining a minimum of 30,000 egress/ingress cycles as defined by ASTM321. In another embodiment, the bond strength may be characterized by sustaining 30,000 to 70,000 egress/ingress cycles, and in yet another embodiment, 40,000 to 60,000 egress/ingress cycles.

In another embodiment, as best illustrated in FIG. 2, a trim cover assembly 20 is shown. The trim cover assembly 20 is an integrally formed design assembly 62. The design assembly 62 is suitably secured to cushion via the peripheral trim panels 22. The design assembly 62 can include a foundation layer 60, and the trim layer 54. The foundation layer 60 may be made of any suitable material, such as foam, plastic, or spacer material, to name a few. Any suitable foam may be a polyurethane, reticulated, or memory foam. Any suitable spacer material can be used, such as, but not limited to, Mueller Textil type, Guilford Mills, polyester knit, faux suede, polyester spacer material, or other suitable material. In some embodiments, the spacer layer may comprise a two-layer construction of scrim or mesh, with filaments extending therebetween. In certain embodiments, the spacer fabric may be a layer or multiple layers formed from polyester fleece, reticulated foam, woven material, or other suitable material. In one or more embodiments, the foundation layer 60 may be prelaminated with an adhesive. Although not shown, any of the layers may include a scrim, such as a prelaminated scrim with foam. In other embodiments, one of the layers may be a scrim layer for supporting the trim cover assembly. Although only one foundation layer 60 is shown, it is understood that additional foundation layers can be stacked, and each layer may be different materials, such as, but not limited to, plus-pad material (e.g., foam, space, 3D knitted material). For example, different types of foundation layers may be used, with or without adhesive, to improve the loft and definition of the design of the raised protrusions. In some embodiments, the foundation layers may have adhesive between the layers such that the layers are bonded during RF welding. In other embodiments, any of the foundation layers may be prelaminated with an adhesive prior to RF welding. For example, all the layers may be prelaminated with adhesive. According to at least one embodiment, the foundation layer may be a bicomponent spacer layer, which, in some instances, includes a scrim having adhesive yarns knitted within the scrim, or in some other instances, includes a layer supported on a separate scrim layer. In the embodiment including the bicomponent spacer layer, the foundation layer does not require prelamination or a step of adding adhesive prior to RF welding.

Additionally, the spacer fabric may be formed from any material having a relatively high air permeability, allowing air to flow in all directions, thus providing breathability for heat/cool applications. In certain embodiments, the air permeability of the spacer layer may be at least 50 cubic feet per minute (cfm) when using ASTM D737 for air permeability of textile fabrics. In some embodiments the air permeability is 50 to 100 cfm, and in other embodiments, 60 to 90 cfm. The foundation layer 60 can have any suitable thickness, but in at least one embodiment has thicknesses of up to 50 mm. In some embodiments, the foundation layer 60 has a thickness of 1 to 15 mm, in other embodiments of 1.5 to 12 mm, and in yet other embodiments of 2 to 10 mm. In certain other embodiments, the foundation layer 60 has a thickness of 5 to 20 mm, and in other embodiments of 6 to 15 mm. In certain other embodiments, the foundation layer 60 comprises 20 to 50 kg/m$^3$ polyester foam.

As shown in the embodiment illustrated in FIG. 2, a layer of glue, or other suitable adhesive 56 or securing mechanism is disposed between the leather 54 and a foundation layer 60 to form a design assembly. In at least one embodiment, glue 56 is a web adhesive that melts when applied with RF welding to adhere the foundation layer 60 to the leather trim cover 54. In other embodiments, the adhesive 56 is prelaminated on to the foundation layer 60 prior to the RF welding. In certain embodiments, the glue 56 is a polyamide spun fab web adhesive having a weight of 0.1 to 5.0 oz/yd$^2$, in other embodiments, 0.5 to 4.0 oz/yd$^2$, and in some embodiments, having a weight of 0.9 oz/yd$^2$.

Figure 3:
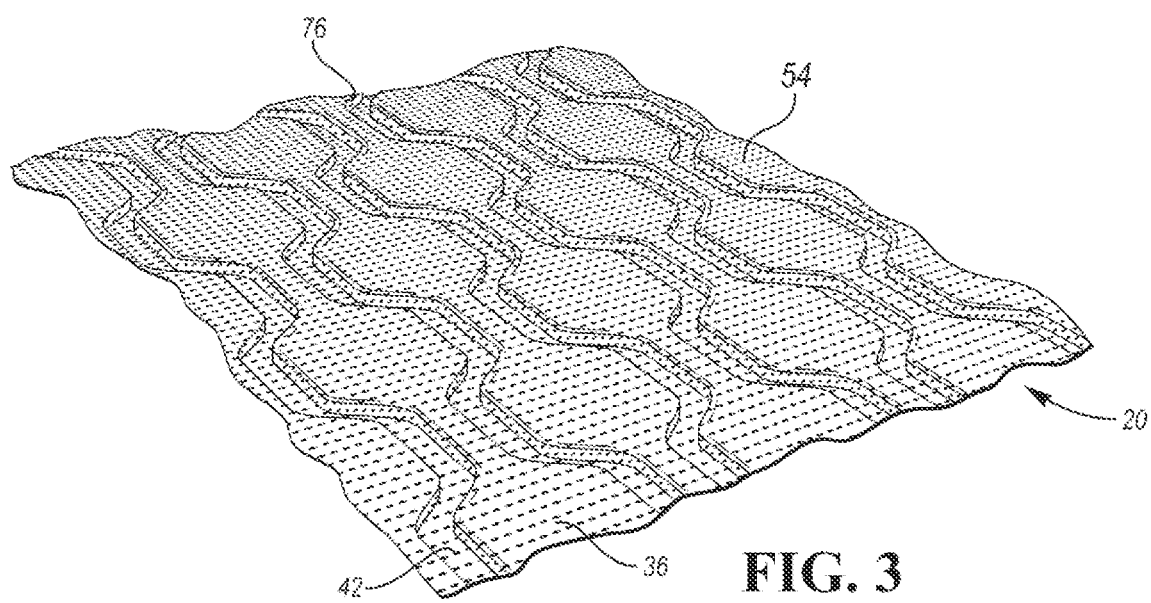
FIG. 3 is a perspective view of a component of a vehicle seat assembly in accordance with an embodiment of the present disclosure.

Referring to FIG. 3, a trim cover assembly 20 of FIG. 2 is illustrated in a partial perspective view. In one embodiment, the molding of the trim cover assembly 20 can take place in a radio-frequency (RF) mold. The leather layer 54 of the trim cover assembly 20 is RF welded such that raised portions 36 form a design in the trim cover assembly 20. In at least one embodiment, the design boundaries 42 are radio-frequency, or RF, weld points (or contact or fuse points) for attaching the leather layer 54 to a foundation layer (not shown). In some embodiments, both the design boundaries 42 and the raised portions 36 are weld points for attaching the leather layer 54 to a foundation layer. The weld points bond the layers, with design flexibility in forming durable and decorative surfaces in the leather when compared with traditional quilting methods. Similar to the above, the bond strength or peel requirements of the trim cover assembly may vary based on the location, pattern, and/or contact area as defined by the design boundaries 42. Furthermore, the bond strength may depend on characteristics of the adhesive, such as the amount, spacing, or density of the adhesive, as well as the processing parameters of the RF welding. In certain embodiments, the weld points (or design boundaries 42) are 1% to 95% of the surface area of the leather layer 54, in other embodiments, 5% to 90% of the surface area of the leather layer 54, in some embodiments 10 to 80%, and in yet another embodiment 15 to 75%. As such, in some embodiments, at the raised portions 36, the leather layer 54 and foundation layer may not be adhered together by RF welding, thus not forming weld points. Although an adhesive may be present at the raised portions 36, or in the instance that the foundation layer is prelaminated at the raised portions 36, the leather layer 54 and foundation layer may not be RF welded at the raised portions 36. Thus, due to the weld points, the design boundaries 42 may be stiffer than the raised portions 36 because of the adhesive. The difference in stiffness may vary based on processing parameters, adhesive strength, the foundation layer selected, layer thickness, or combinations thereof.

As shown in the embodiment of FIG. 3, holes 76 may be included in the leather layer 54, the foundation layer, or both. However, it should be understood that the holes 76 can be optional such as when used with non-temperature controlled seats. Furthermore, it should be understood that the holes 76 can be optional on some or all of the raised portions 36 and/or the design boundaries 42 to provide a desired air permeability to the design assembly.

In one embodiment, the trim cover assembly 20 can be made using an RF welding process. Using a RF mold assembly, a magnetic field is generated to melt the adhesive. Making reference to FIG. 4, a method of making the trim cover assembly 20 is schematically illustrated according to an embodiment. A suitable mold assembly 64, such as the illustrated one having an upper mold half 64a and a lower mold half 64b is provided. A suitable patterned tool 70 is also provided in the mold assembly 64. The patterned tool 70 includes shapes corresponding to the design such that the raised portions are formed according to the shapes in the patterned tool 70. In at least the illustrated embodiment, the components of the trim cover assembly 20 include a leather layer 54 (or A-surface material), a foundation layer 60, and an adhesive 56 therebetween. In certain embodiments, the adhesive may be a layer, and in other embodiments, be located based on the location of the design boundaries of the trim cover assembly. The foundation layer 60 may be a foam, plastic, spacer material, or other suitable material. The adhesive layer 56 may be a glue layer or a web adhesive. Although adhesive may be present at the shapes in the patterned tool (which form the raised portions), the layers in some embodiments are only fused at the design boundaries. In other embodiments, the layers are adhered at the raised portions as well.

Although the mold assembly 64 includes a buffer layer 72, this is shown for exemplary purposes and the trim cover assembly 20 may be molded without using a buffer layer 72. The buffer layer 72 may be any non-stick layer, such as, but not limited to, a silicone, Teflon, mylar, rubber, or any suitable non-stick layer. The density or thickness of the buffer layer may vary based on the molding parameters used, in order to prevent the trim cover assembly 20 from sticking to the upper press plate 64a. In addition, insulating the materials and patterned tool helps prevent arcing in the mold during welding.

Figure 4:
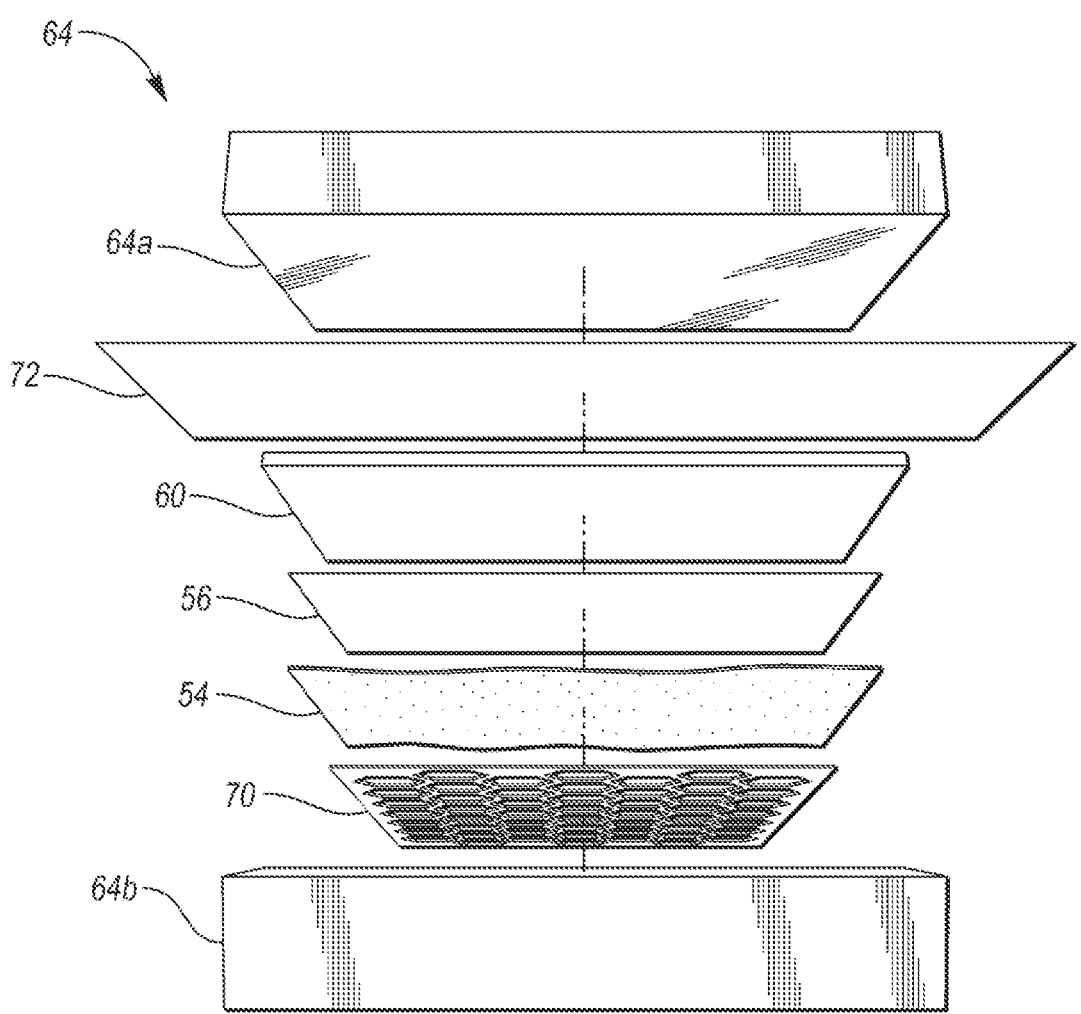
FIG. 4 is a schematic illustration of a method useable to make a component of a seat assembly in accordance with an embodiment of the present disclosure.

As best understood making reference FIG. 4, the trim layer 54, the adhesive 56, the foundation layer 60, and the patterned tool 70 are placed into the RF mold 64 (with an optional buffer layer 72) and compressed with magnetic field applied for suitable time and under suitable conditions, such as at 0.1 to 15 Amps, at a pressure of 2,000 to 50,000 KGs, and for 0.1 to 300 seconds, to allow the raised portions 36 and design boundaries 42 to form in the trim cover assembly 20 and to allow the foundation layer 60 to bond to the trim cover 54. In an embodiment, the magnetic field is applied at 0.6 to 10 amps, at a pressure of 2,000 to 50,000 KGs, for 2 to 300 seconds. The time and conditions used for the RF mold 64 may vary depending on the material and thickness parameters selected, and as well as the desired bond strength/durability of the finished trim cover. The trim layer 54 stays on top of the patterned tool 70 pressing down into the design of the patterned tool 70 to form the design in the trim layer 54 and to adhere the glue 56 or any other suitable adhesive to the trim cover assembly 20 to provide the desired shape and depth of the final design of the central panel portion 28. The central panel portion 28 is then secured to the panels 22. Alternatively, in certain embodiments, patterns could be formed on the entire trim cover assembly, including the panels 22, and further, in some embodiments, different patterns may be formed on the central panel portion 28 from those formed on the panels 22. In yet other embodiments, only the central panel portion 28, or alternatively, only the panels 22 have a pattern. While it should be understood that the layer 54 can have any suitable shape and/or size, in at least one embodiment the layer 54 has a thickness of 0.5 to 5 mm, in other embodiments of 0.6 to 3 mm, and in yet other embodiments of 0.7 to 2 mm.

Figure 5:
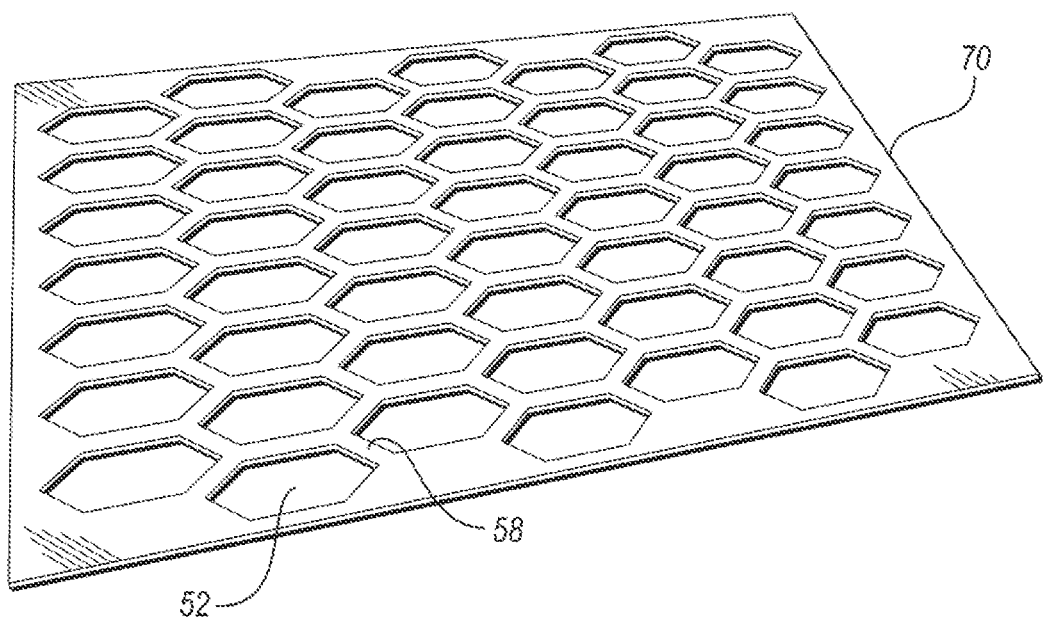
FIG. 5 is a perspective view of a component used to make a vehicle seat assembly in accordance with an embodiment of the present disclosure.

Making reference to FIG. 5, an exemplary patterned tool 70 is schematically illustrated. The patterned tool 70 can be made of a suitable material, such as aluminum, brass and other metals. As best shown in FIG. 6, the patterned tool 70 has shaped openings 52 within aluminum wall members 58. The openings 52 are generally the same shape and slightly larger, such as 2 to 10%, than the shape and size of the raised portions to account for the material thickness stack up. The wall members 58 pinch the layers of the trim cover assembly to form the RF welded fuse points corresponding to the design boundaries adjacent to the raised portions of the protruding design. The patterned tool 70 can have any suitable thickness, and in at least one embodiment has a thickness of 10 mm to 100 mm. In some embodiments, the thickness of the patterned tool 70 is 12 mm to 30 mm. The patterned tool 70 can be secured to, or adjacent to, one of the mold halves in the RF welding mold. Alternatively, the patterned tool 70 can be integral with one of the mold halves of the RF welding mold. In at least one embodiment, the layer 54 is loosely laid on the design assembly 62.

According to embodiments of the present disclosure, a trim cover assembly for a vehicle seat cushion is provided. In at least one embodiment, the trim cover assembly includes a trim layer (A-surface layer) having a design formed integrally therein by radio-frequency (RF) welding the trim layer to a foundation layer via applying a magnetic field to an adhesive between the trim layer and foundation layer. The contact points between the layers form design boundaries adjacent to raised portions based on a patterned tool in the mold, thus forming a protruding design in the leather layer A-surface.

The details, designs, variants, aspects and embodiments shown and described herein are applicable to automotive, other vehicular, and non-regulated seating. While exemplary embodiments are described above, it is not intended that these embodiments describe all possible forms of the disclosure. For instance, the shaped protrusions in the layer of leather can have a sewn pattern of thread outlining the protrusions. Rather, the words used in the specification are words of description rather than limitation, and it is understood that various changes may be made without departing from the spirit and scope of the disclosure. Additionally, the features of various implementing embodiments may be combined to form further embodiments of the disclosure. It should be understood that the present disclosure contemplates a seat system or a thoracic region support seating system comprising any combination of features shown in the figures and/or described in the application.

What is claimed is:

1. A vehicle seat assembly comprising:
a cushion; and
a non-synthetic leather trim cover assembly disposed over the cushion, the leather trim cover assembly having a leather upper layer and a foundation layer secured to the leather upper layer at radio-frequency weld points, the leather trim assembly having a plurality of spaced apart raised and resilient pre-defined geometric shaped protrusions bonded to the leather upper layer, the radio-frequency weld points defining a plurality of design boundaries, each design boundary adjacent a corresponding geometric shaped protrusion in the leather trim cover assembly.

2. The vehicle seat assembly of claim 1, wherein the leather trim cover assembly has a first thickness at the radio-frequency weld points and a second thickness at the raised portion, the second thickness being greater than the first thickness.

3. The vehicle seat assembly of claim 1, wherein an adhesive layer bonds the bottom surface of the leather upper layer to the upper surface the foundation layer at the radio-frequency weld points.

4. The vehicle seat assembly of claim 1, wherein the leather upper layer is not adhered to the foundation layer at the raised portion.

5. The vehicle seat assembly of claim 1, wherein the leather upper layer is adhered to the foundation layer at the raised portion.

6. The vehicle seat assembly of claim 1, wherein the foundation layer is a spacer layer having an air permeability of at least 50 cubic feet per minute.

7. The vehicle seat assembly of claim 1, wherein the foundation layer is a foam layer.

8. The vehicle seat assembly of claim 1, wherein the radio-frequency weld points have a width of 0.05 to 50 mm.

9. The vehicle seat assembly of claim 1, wherein the radio-frequency weld points provide a bond strength of at least 2 N per 5 cm.

10. The vehicle seat assembly of claim 1, wherein the radio-frequency weld points comprise 1% to 80% of a surface of the leather trim cover assembly.

11. The vehicle seat assembly of claim 9, wherein the geometric shaped protrusions are adhesively bonded to the leather upper layer.

12. A vehicle seat assembly comprising:
a cushion; and
a leather trim cover assembly disposed over the cushion, the leather trim cover assembly having a leather upper layer and a foundation layer secured to the leather upper layer at radio-frequency weld points, the leather trim assembly having a plurality of spaced apart raised and resilient pre-defined geometric shaped protrusions bonded to the leather upper layer, the radio-frequency weld points defining a plurality of design boundaries, each design boundary adjacent a corresponding geometric shaped protrusion in the leather trim cover assembly,
wherein an adhesive layer is disposed between and bonds the leather upper layer and the foundation layer at the radio-frequency weld points; and
wherein the leather upper layer is not adhered to the foundation layer at the raised portion.

13. The vehicle seat assembly of claim 12, wherein the adhesive layer comprises a sheet of glue.

14. The vehicle seat assembly of claim 13, wherein the adhesive layer comprises a sheet having similar length and width dimensions as the leather upper layer.

15. The vehicle seat assembly of claim 12, wherein the radio-frequency weld points have a width of 0.05 to 50 mm and provide a bond strength of at least 2 N per 5 cm.

16. The vehicle seat assembly of claim 12, wherein the radio-frequency weld points comprise 1% to 80% of a surface of the leather trim cover assembly and the geometric shaped protrusions are adhesively bonded to the leather upper layer.

17. A vehicle seat assembly comprising:
a cushion; and
a leather trim cover assembly disposed over the cushion, the leather trim cover assembly having a leather upper layer, an adhesive layer, and a foundation layer secured to the leather upper layer at radio-frequency weld points, the leather trim assembly having a plurality of spaced apart raised and resilient pre-defined geometric shaped protrusions bonded to the leather upper layer, the radio-frequency weld points defining a plurality of design boundaries, each design boundary adjacent a corresponding geometric shaped protrusion in the leather trim cover assembly;
wherein the foundation layer is a spacer layer having an air permeability of at least 50 cubic feet per minute; and
wherein the adhesive layer is disposed between the leather upper layer and the foundation layer and bonds the leather upper layer and the foundation layer at the radio-frequency weld points.

18. The vehicle seat assembly of claim 17, wherein the adhesive layer comprises a sheet of glue.

19. The vehicle seat assembly of claim 17, wherein the adhesive layer comprises a sheet having similar length and width dimensions as the leather upper layer, wherein the radio-frequency weld points have a width of 0.05 to 50 mm and provide a bond strength of at least 2 N per 5 cm, and wherein the radio-frequency weld points comprise 1% to 80% of a surface of the leather trim cover assembly and the geometric shaped protrusions are adhesively bonded to the leather upper layer.

20. The vehicle seat assembly of claim 1, wherein each design boundary has a first portion connected to a second portion with the first portion extending in a first direction and the second portion extending in a second direction, the second direction being different than the first direction.

\* \* \* \* \*